(12) United States Patent
Chatterjee

(10) Patent No.: US 11,410,167 B2
(45) Date of Patent: Aug. 9, 2022

(54) EFFICIENT TRANSACTION RECONCILIATION SYSTEM

(71) Applicant: PayPal, Inc., San Jose, CA (US)

(72) Inventor: Niladri Chatterjee, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 58 days.

(21) Appl. No.: 16/730,695

(22) Filed: Dec. 30, 2019

(65) Prior Publication Data

US 2021/0201308 A1 Jul. 1, 2021

(51) Int. Cl.
*G06Q 20/38* (2012.01)
*G06Q 20/40* (2012.01)

(52) U.S. Cl.
CPC ....... *G06Q 20/3827* (2013.01); *G06Q 20/383* (2013.01); *G06Q 20/4014* (2013.01)

(58) Field of Classification Search
CPC ............ G06Q 20/3827; G06Q 20/383; G06Q 20/4014
See application file for complete search history.

(56) References Cited

U.S. PATENT DOCUMENTS

| | | | | |
|---|---|---|---|---|
| 5,475,826 A * | 12/1995 | Fischer | ................ | G06F 21/565 707/753 |
| 5,687,361 A * | 11/1997 | Sarkar | ................ | G06F 16/9014 |
| 5,694,569 A * | 12/1997 | Fischer | .................. | G06F 21/64 711/219 |
| 5,758,147 A * | 5/1998 | Chen | ................... | G06F 16/2465 |
| 10,055,446 B2 * | 8/2018 | Pattanaik | ............. | H04L 9/3239 |
| 10,867,299 B2 * | 12/2020 | Cheng | ................... | G06Q 30/06 |
| 2009/0238365 A1 * | 9/2009 | Bardera Bosch | ..... | G06F 21/645 380/259 |
| 2015/0067278 A1 * | 3/2015 | Gurumurthi | ........ | G06F 12/0811 711/154 |
| 2015/0074063 A1 * | 3/2015 | Hugg | .................... | G06F 16/184 707/690 |

(Continued)

FOREIGN PATENT DOCUMENTS

| | | | | |
|---|---|---|---|---|
| EP | 0654920 A2 * | 5/1995 | ........... | H04L 9/3236 |
| EP | 2477137 A1 * | 7/2012 | ............. | G06F 21/64 |

(Continued)

OTHER PUBLICATIONS

Buterin, "Merkling in Ethereum," Ethereum Foundation Blog, all pages. (Year: 2015).*

(Continued)

*Primary Examiner* — Jacob C. Coppola
(74) *Attorney, Agent, or Firm* — Haynes and Boone, LLP

(57) ABSTRACT

A system includes a first module that asynchronously communicates with a second module. The first module processes a set of digital transactions and transmits instructions for the second module to process the same set of digital transactions. The first module maintains a first aggregated hash value corresponding to the set of digital transactions that have been processed. The first aggregated has value is calculated using a commutative and associative hash function. The second module maintains a second aggregated hash value corresponding to a second set of digital transactions processed by the second module. The first and second aggregated hash values are compared to determine the second module processed the same digital transactions as the first module.

20 Claims, 5 Drawing Sheets

(56) References Cited

U.S. PATENT DOCUMENTS

2019/0334920 A1* 10/2019 Kelly .................... H04L 9/3239
2020/0186355 A1*  6/2020 Davies ................. H04L 9/3239
2021/0157802 A1*  5/2021 Tegegne ............. G06F 16/2255

FOREIGN PATENT DOCUMENTS

EP            3333747 A1 *  6/2018  ............. G06F 21/64
WO    WO-2018146113 A1 *  8/2018  ........... H04L 9/0643

OTHER PUBLICATIONS

Burkhardt et al., "Distributed Ledger," 2018 IEEE Int. Conf. on Engineering, Tech., and Innovation, IEEE, all pages. (Year: 2018).*

* cited by examiner

EFFICIENT TRANSACTION RECONCILIATION SYSTEM

BACKGROUND

Technical Field

This disclosure relates generally to facilitating digital transactions and, more specifically, to an efficient transaction reconciliation system.

Description of the Related Art

Digital transactions are a ubiquitous part of everyday business and commerce. Within a transaction system, different components communicate with each other regarding transactions that are being processed by the transaction system. In an asynchronous transaction system, a first component may transmit instructions to process transaction information to a second component and continue to process transactions without waiting for a response from the second component. However, in certain instances, the second component may fail to process the transaction information. Detecting such a failure may prove resource intensive as the number of transactions processed by the transaction system scales to very high numbers.

Figure 1:
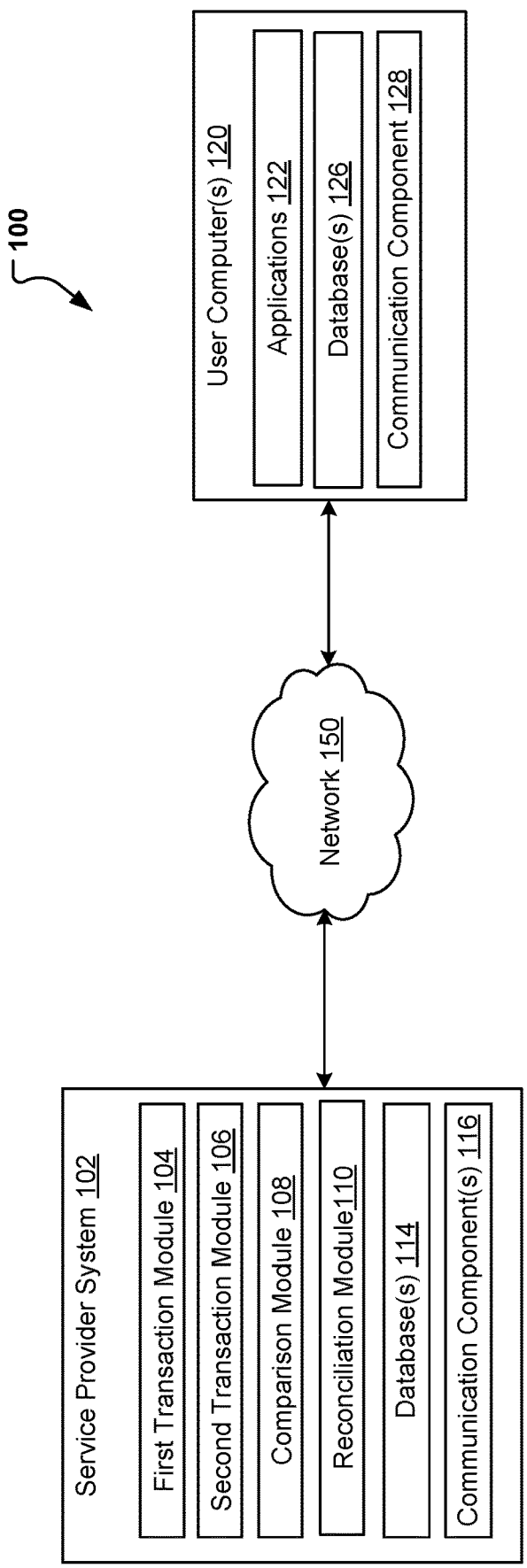
FIG. 1 is a block diagram illustrating an example system for an efficient transaction reconciliation system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "account selection module" "configured to select and/or identify one or more accounts" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for an efficient transaction reconciliation system. A service provider system maintained by a service provider is configured to receive and process digital transactions associated with various user accounts with the service provider. The service provider system includes multiple modules and applications that communicate with each other to process a transaction. One or more of the modules may be configured to communicate with each asynchronously.

For example, a first module may be configured to process a digital transaction in some manner and then instruct and/or a second module to perform its operations with respect to the digital transaction. After instructing the second module, the first module may continue processing other transactions without waiting for a response and/or acknowledgment from the second module that the second module has performed its operations with respect to the digital transaction.

In certain instances, however, the second module may fail to perform its operations with respect to digital transaction. Various issues may cause such a failure, such as a networking failure that breaks communication between the first module and the second module. As another example, the data communicated between the first module and the second module may become corrupted. In another example, the device executing the second module may fail. It will be appreciated that various other reasons may cause the failure.

Typical implementations for detecting such failures may include each of the first module and the second module maintain a log of each transaction that is processed. The logs are periodically compared to determine whether there are any differences. However, for a transaction system that processes a large amount of transactions (e.g., millions per day), such a framework may consume too many computing and storage resources and take too much time.

Other implementations may include hashing algorithms that generate a first hash for the transactions processed by the first module and a second hash for transactions processed by the second module. The first hash and the second hash are compared to determine whether there are any differences, which would indicate the second module has not processed one or more transactions processed by the first module. However, typical hashing algorithms may be affected by the sequence in which transactions are hashed. Thus, in the asynchronous system that includes the first module and the second module, the first hash may be different from the second hash if the second module processes the same transactions as the first module but in a different order than the first module.

According to certain embodiments, the service provider system may be configured to perform transaction reconciliation that minimizes computing resource usage and that is compatible with asynchronous communication. The service provider system includes a first transaction module that processes digital transactions and asynchronously transmits instructions to a second transaction module to process the same digital transactions. Further, the service provider system maintains a first aggregated hash value corresponding to the first transaction module. The first aggregated hash value is updated each time the first transaction module processes a digital transaction.

The first aggregated hash value is updated via a hashing function that is commutative and associative. The hashing functions receives two inputs: a current hash value and transaction information associated with a digital transaction. According to a particular embodiment, the transaction information includes a transaction identifier associated with the digital transaction, though it will be appreciated that other types of transaction information are also contemplated. Based on the inputs, the hashing function outputs a new hash value. Thus, in order to update the first aggregated hash value based on a digital transaction being processed by the first transaction module, the first aggregated hash value and a transaction identifier associated with the digital transaction may be input to the hashing function. The output of the hashing function is the updated first aggregated hash value.

Similarly, the service provider system maintains a second aggregated hash value corresponding to the second transaction module. The second aggregated hash value is updated each time the second transaction module processes a digital transaction. The second aggregated hash value may be updated using the same hashing function that is used to update the first aggregated hash value.

As such, the service provider server may also include a comparison module configured to compare the first aggregated hash value and the second aggregated hash value at any given point in time. According to certain embodiments, the comparison module is configured to compare the first aggregated hash value and the second aggregated hash value on a periodic basis (e.g., every 30 minutes). The comparison module may also be configured to compare the aggregated values on demand.

Since the hashing function has both commutative and associative properties, the order in which digital transactions are processed does not affect the output of the hashing function. Thus, if the second transaction module processes the same digital transactions as the first transaction module in a given time period, but in a different order, the first aggregated hash value remains equal to the second aggregated hash value. Further, the time need to compare the first hash aggregated hash value and the second aggregated hash value remains a constant irrespective of the amount of transactions processed by the first transaction module and the second transaction module, respectively.

If the comparison module determines that the first aggregated hash value is equal to the second aggregated hash value, then no reconciliation actions need to be taken. If the comparison module determines that the first aggregated hash value is different from the second aggregated has value, the comparison module causes one or more reconciliation operations. This is because the first aggregate hash value being different from the second aggregate hash value indicates that the second transaction module did process, with the given time period, the exactly the same digital transactions as the first module.

FIG. 1 is a block diagram illustrating an example system 100 for an efficient transaction reconciliation system. In the illustrated embodiment, the system 100 includes a service provider system 102, maintained by a service provider, in communication with other computer(s) 120 via a network 150. It will be appreciated that the service provider system 102 may include one or more computers, servers, and/or other devices, and that the modules included in the service provider system 102 may be executed by any combination of those devices.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, service provider system 102 may include a first transaction module 104, a second transaction module 106, a comparison module 108, a reconciliation module 110, database(s) 114, and communication components 116. Each of the components of the service provider system 102 may communicate with each other to implement the efficient transaction reconciliation system, as will be described in more detail below.

The service provider system 102 may be configured to process digital transactions corresponding to various user accounts with service provider (e.g., such as those initiated by the user computer(s) 120). As such, the first transaction module 104 and the second transaction module 106 may each be configured to process digital transactions at different stages of transaction processing by the service provider system 102. In particular, for each digital transaction processed by the first transaction module 104, the first transaction module may be configured to asynchronously transmit a communication to the second transaction module 106 that causes the second transaction module 106 to also process the digital transaction.

According to a particular embodiment, the digital transactions may correspond to payment transactions, and the first transaction module 104 may correspond to intake module that directs transaction information corresponding to the payment transactions to appropriate modules in the service provider system 102 for further processing. Such modules may include a risk module that determines a likelihood that transactions are fraudulent, the second processing module 106, and/or any other relevant modules or applications. The second processing module 106 may correspond to a settlement module that credits and/or debits the appropriate user accounts with the service provider according to the transaction information.

The first transaction module 104 may maintain a first aggregated hash value corresponding to a first set of transactions that have been processed by the first transaction module 104. According to particular embodiment, the first aggregated hash value may be stored in a database 114 though any type of storage is also possible. The first transaction module 104 updates the first aggregated hash value each time the first transaction module 104 processes a digital transaction. The first transaction module 104 updates the first aggregated hash value using a hashing function having both a commutative property and an associative property.

Additionally, the first transaction module 104 asynchronously transmits instructions to the second transaction module 106 to process the digital transaction according to its respective operations. In certain embodiments, the first transaction module 104 may transmit the instructions to the second transaction module 106 prior to updating the first aggregated hash value (e.g., prior to completing the processing of the digital transaction). For instance, using the example of the payment transaction, the first transaction module 104 (e.g., the intake module) may wait for an output of the risk module before updating the first aggregate hash value. In the meantime, the first transaction module 104 may transmit instructions to the second transaction module 106 (e.g., the settlement module) to process the digital transaction according to the respective operations of the second transaction module 106.

The second transaction module 106 may maintain a second aggregated hash value corresponding to a second set of transactions that have been processed by the second transaction module 106. The second aggregated hash value may be stored in the same storage as the first aggregated hash value or in a different storage. According to a particular embodiment, the second aggregated has value is stored in the database 114. Further, the second transaction module 106 is configured to update the second aggregated hash value using the same hashing function used by the first transaction module 104 to update the first aggregated hash value.

The hashing function may receive, as inputs, a current hash value and transaction information of the digital transaction being processed. In some implementations, the transaction information includes a transaction identifier associated with the digital transaction. The hash function may have two inputs: a hash value and a transaction (e.g., a transaction identifier). Based on the two inputs, the hashing function outputs a new hash value according to a mathematical algorithm. Thus, each time the first transaction module 104 processes a digital transaction, the hashing function is applied to the transaction identifier associated with the digital transaction and the current value of the first aggregated hash value that was calculated based on the previously processed transaction by the first transaction module 104. Similarly, each time the second transaction module 106 processes a digital transaction, the hashing function is applied to the transaction identifier associated with the digital transaction and the current value of the second aggregated hash value that was calculated based on the previously processed transaction by the second transaction module 106.

For example, suppose the first transaction module 104 processes transactions T1, T2, and T3 in succession. After processing transaction T1, the first transaction module 104 may execute the hashing function with respect to T1, and an initial hash value, such as 0, though the initial hash value may be any value. This produces hash value H1. Next, after processing transaction T2, the hashing function is executed with respect to transaction T2, and hash value H1, thereby outputting aggregated hash value H2. After processing transaction T3, the hashing function is executed with respect to transaction T3 and hash value H2, thereby producing aggregated hash value H3.

Figure 3:
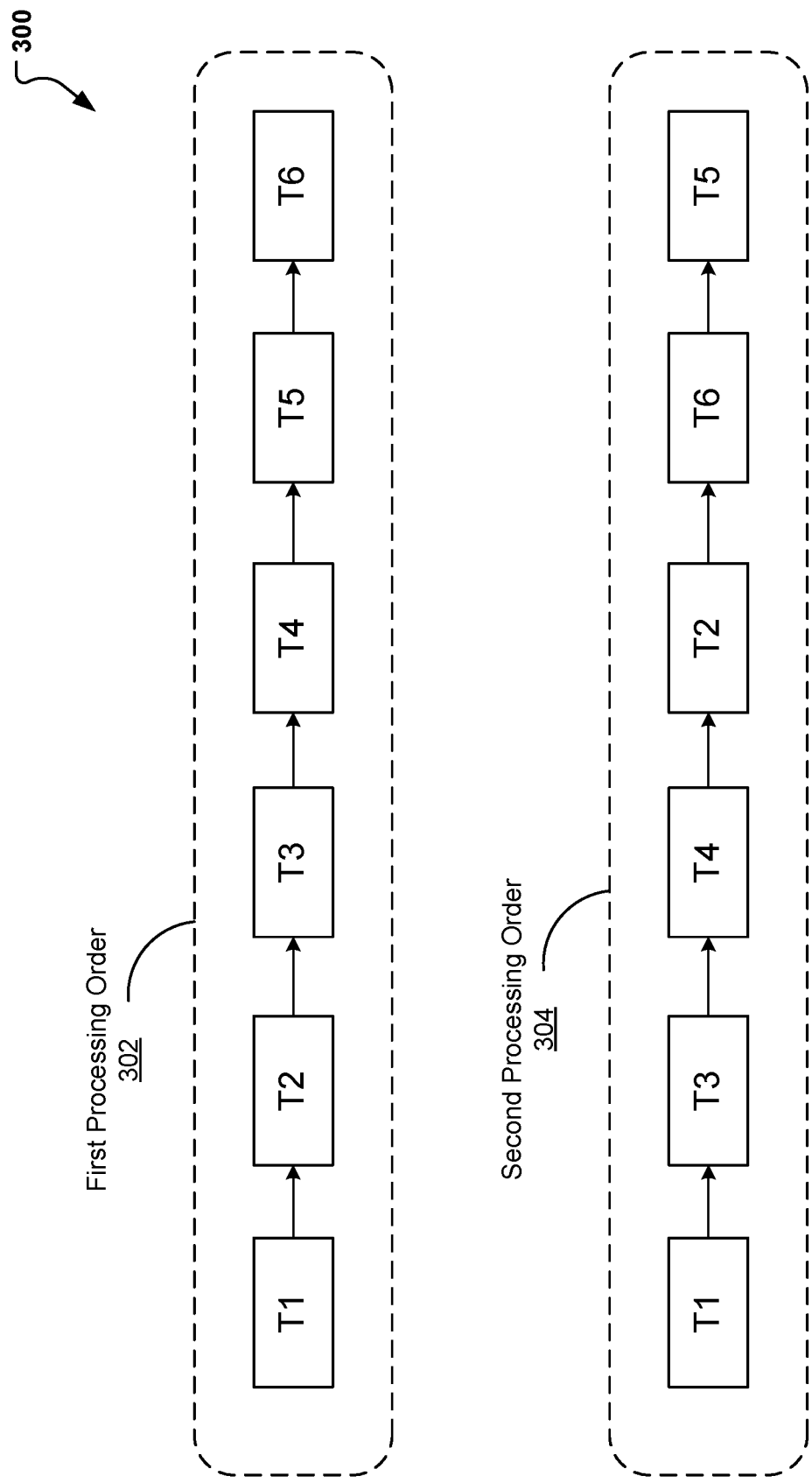
FIG. 3 is a diagram illustrating difference processing sequences, according to some embodiments.

As previously discussed, the hashing function is both commutative and associative. Because the hashing function is commutative and associative, the order in which respective transactions in a set of digital transactions are hashed does not affect the output hash value. For example, FIG. 3 illustrates a first processing order 302 and a second processing order 304. In the first processing order 302, transaction T1 is processed, followed by transactions T2, T3, T4, T5, and T6, successively. In the second processing order 304, transaction T1 is processed, followed by transactions T3, T4, T2, T6, and T5. Thus, transactions T1-T6

The commutative property of the hashing function can be described by the expression:

$$\text{hash}(T1,T2,T3) = \text{hash}(T1,T3,T2)$$

where T1, T2, and T3 are transactions or transaction identifiers, and hash( ) is the hashing function. The associative property of the hashing function can be described by the expression:

$$\text{hash}(T1,\text{hash}(T2,T3)) = \text{hash}(\text{hash}(T1,T2),T3)$$

Further, in certain embodiments, the hashing function does not have the identity property. In other words, inputting the same transaction multiple times to the hashing function should produce a different hash value each time. The identity property may be described the expression:

$$\text{hash}(T1,\text{hash}(T2,T3)) = \text{hash}(T1,\text{hash}(T1,\text{hash}(T2,T3)))$$

According to a particular embodiment, the hashing algorithm may be given by the formula:

$$(p + q^*(T+H) + r^*T^*H) \bmod n$$

where p, q, and r are constants, T is a transaction (e.g., transaction identifier), H is a hash value, and n is a prime number.

The comparison module 108 may be configured to compare the first aggregated hash value and the second aggregated hash value at a given point in time. The comparison module 108 may perform this comparison periodically (e.g., every 30 minutes, every hour, etc.) and/or on demand. Based on the comparison, the comparison module 108 may determine whether any reconciliation action is to be taken.

For example, if the comparison module 108 determines, at a given point in time, that the first aggregated hash value is equal to the second aggregated hash value, then no reconciliation action is taken. This is because the first aggregated hash value being equal to the second aggregated hash value indicates that the first transaction module 104 and the second transaction module 106 have processed the same transactions, at least since the last time the comparison module 108 performed the comparison. If the comparison module 108 determines that the first aggregated hash value is different from the second aggregated hash value, the comparison module 108 determines that one or more reconciliation operations are to be performed.

The reconciliation module 110 is configured to perform the one or more reconciliation operations. The reconciliation module 110 may perform a second comparison between the first aggregated hash value and the second aggregated hash value. According to a particular embodiment, the second comparison may include performing an extended Euclidean algorithm using the first and second aggregated hash values. Based on the comparison, the reconciliation module 110 may identify one or more missing transactions that the second transaction module 106 failed to process and/or one or more transactions that the second transaction module 106 processed but that the first transaction module 104 did not process.

In situations where the reconciliation module 110 identifies a missing transaction that the second transaction module 106 failed to process but that the first transaction module 104 did process, the reconciliation module 110 may instructions to the second transaction module 106 that causes it to process the missing transaction. The second aggregated hash value is then updated with the missing transaction using the hashing function.

In situations where the reconciliation module 110 identifies an extra transaction that the second transaction module 106 did process but that the first transaction module 104 did not process, the reconciliation module 110 may cause the effects of the second transaction module 106 processing the extra transaction to be reversed. For example, one or more credits and debits corresponding to the extra transaction may be reversed.

Further, the second aggregated hash value may be updated to reflect a removal of the extra transaction from being included in the second aggregated hash value. It will be appreciated that due commutative and associative nature of the hashing function, updating the second aggregated hash value to remove the extra transaction may have a time complexity that is constant. According to a particular embodiment, an extended Euclidean algorithm is used to remove the extra transaction.

The database(s) 114 stores various information that may include, for example, identifiers (IDs) such as operating system registry entries, cookies, IDs associated with hardware of the communication component 116, IDs used for payment/user/device authentication or identification, and/or other appropriate IDs. Further, the database 114 may store login credentials (e.g., such as to login to an account with the service provider and/or other accounts with other service providers), identification information, biometric information, and/or authentication information of the user the applications 122 connect to the service provider system 102 to access. The database 114 may also store the review queue 106 in some embodiments.

The communication component 116 may be configured to communicate with various other devices, such as the user computer(s) 120 and/or other devices. In various embodiments, communication component 14 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the user computer(s) 120, each of which includes applications 122, database 126, and communication component 128. As previously discussed, the applications 122 may be any type of application that access the service provider system 102. According to a particular embodiment, the applications are user applications for a payment service provider that communicates with the service provider system 102 to facilitate payment transactions and other financial transactions.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
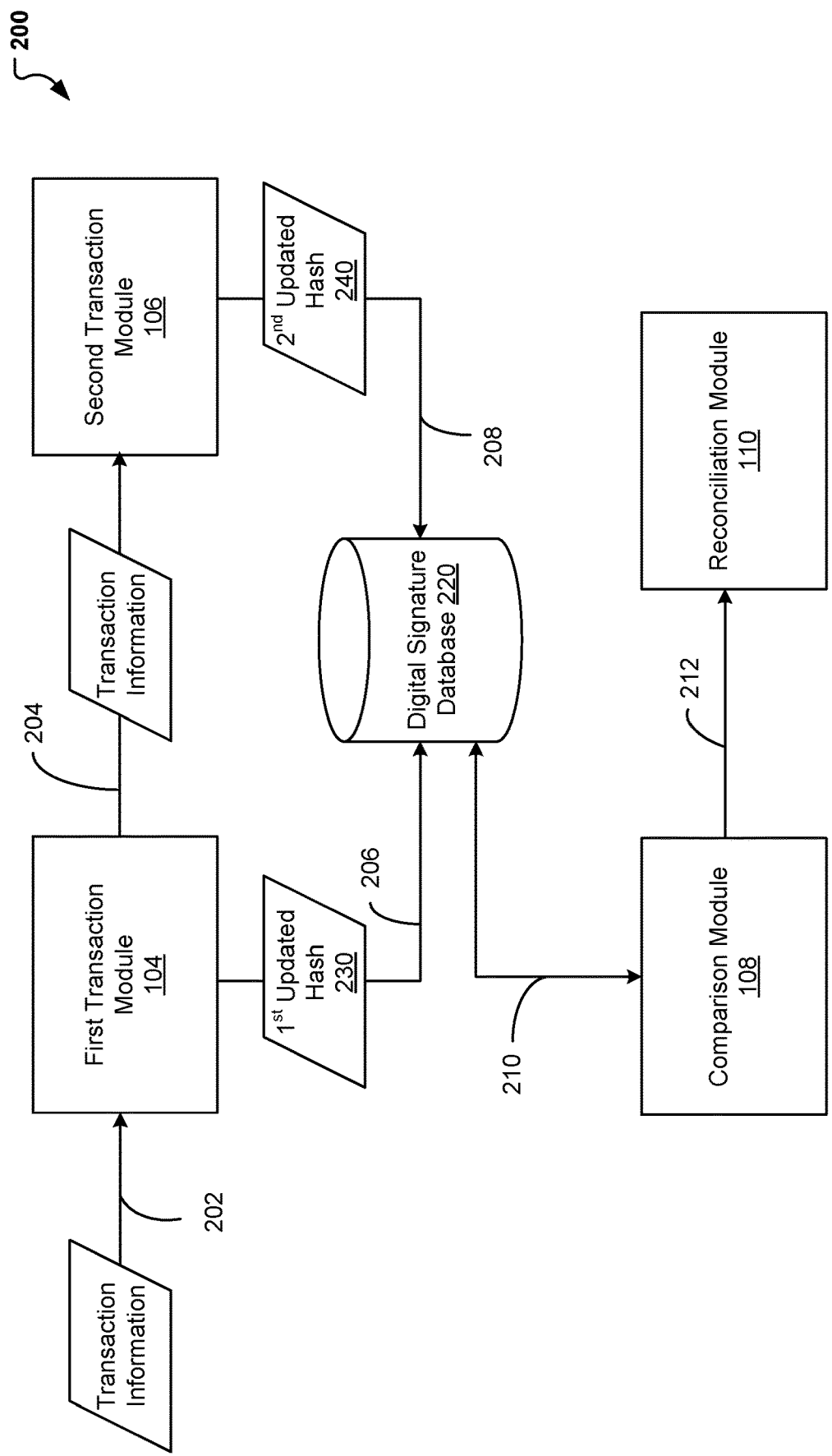
FIG. 2 is a diagram illustrating a data flow for an efficient transaction reconciliation system, according to some embodiments.

FIG. 2 illustrates a data flow diagram 200 for an efficient transaction reconciliation system in accordance with a particular embodiment. As shown in FIG. 2, transaction information corresponding to a digital transaction may be transmitted to the first transaction module 104 at step 202. The first transaction module 104 processes the transaction information and asynchronously transmits instructions for the second transaction module 106 to process the transaction information at step 204.

At step 206, the first transaction module 104 updates a first aggregated hash value 230 based on the transaction information and the first aggregated hash value. The first aggregated hash value is updated via a hashing function that is commutative and associative. The updated first aggregated hash value is stored in the digital signature database 220.

At step 208, the second transaction module 106 updates a second aggregated hash value 240 based on the transaction information and the second aggregated hash value. The second aggregated hash value is also updated via the same hashing function used to update the first aggregated hash value. The updated second aggregated hash value is stored in the digital signature database 220.

At step 210, the comparison module accesses the digital signature database 220 to retrieve the updated first aggregated hash value 230 and the updated second aggregated hash value 240. The comparison module compares the first aggregated hash value 230 and the updated second aggregated hash value 240. At step 212, if the hash values are different, the comparison module 108 indicates the difference to the reconciliation module 110 which performs one or more reconciliation operations.

Figure 4:
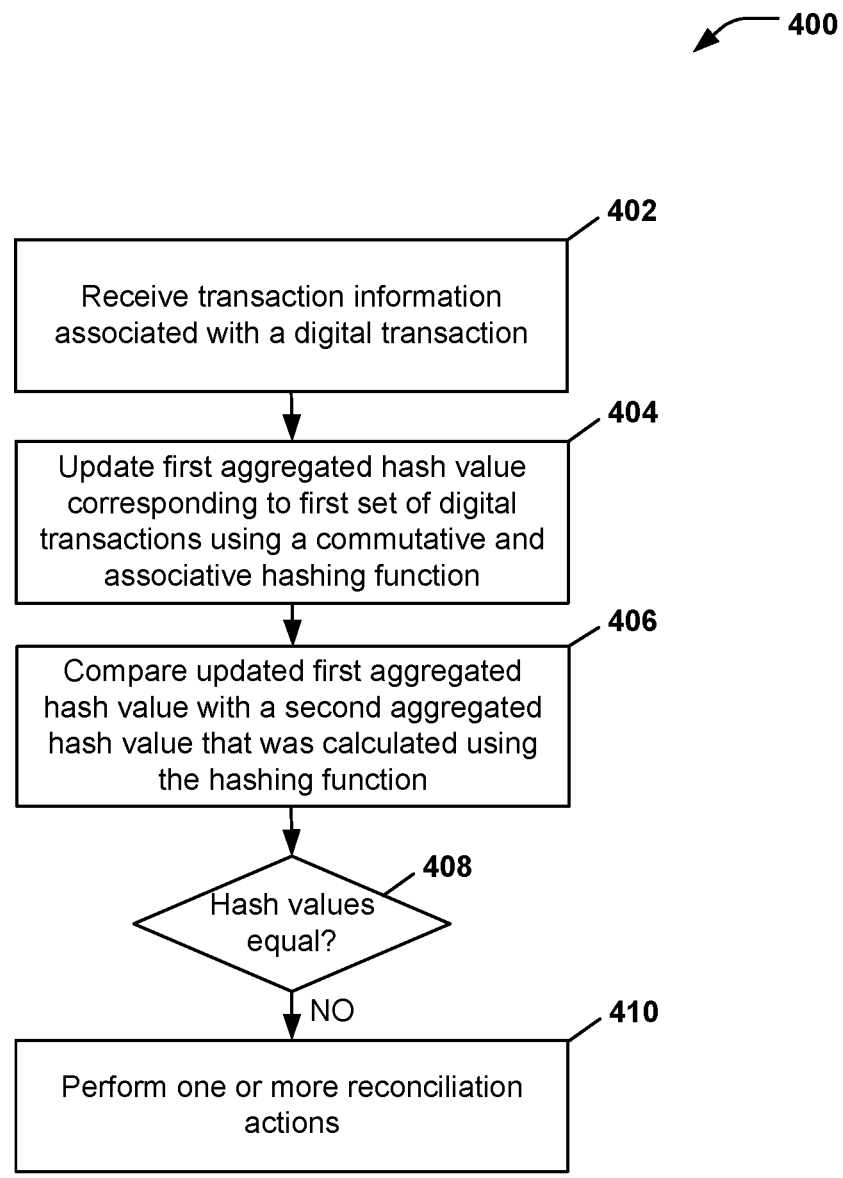
FIG. 4 illustrate a flow diagram that depicts a method for implementing an efficient transaction reconciliation system, according to some embodiments.

FIG. 4 illustrates a flow diagram of a method 400 for an efficient transaction reconciliation system, in accordance with one or more particular embodiments. The method 400 may be performed by the service provider system 102. The method 400 beings at step 402 where the service provider system 102 receives transaction information associated with a digital transaction.

At step 404, the service provider system 102 updates a first aggregated hash value corresponding to a first set of digital transactions using a commutative and associative hash function. At step 406, the service provider system 102 compares the updated first aggregated hash value with a second aggregated hash value that was calculated using the hashing function.

At step 408, the service provider system 102 determines whether the updated first aggregated hash value is equal to the second aggregated hash value. If the two aggregated hash values are different, the method 400 proceeds to step 410, where the service provider system 102 performs one or more reconciliation operations.

Example Computing Device

Figure 5:
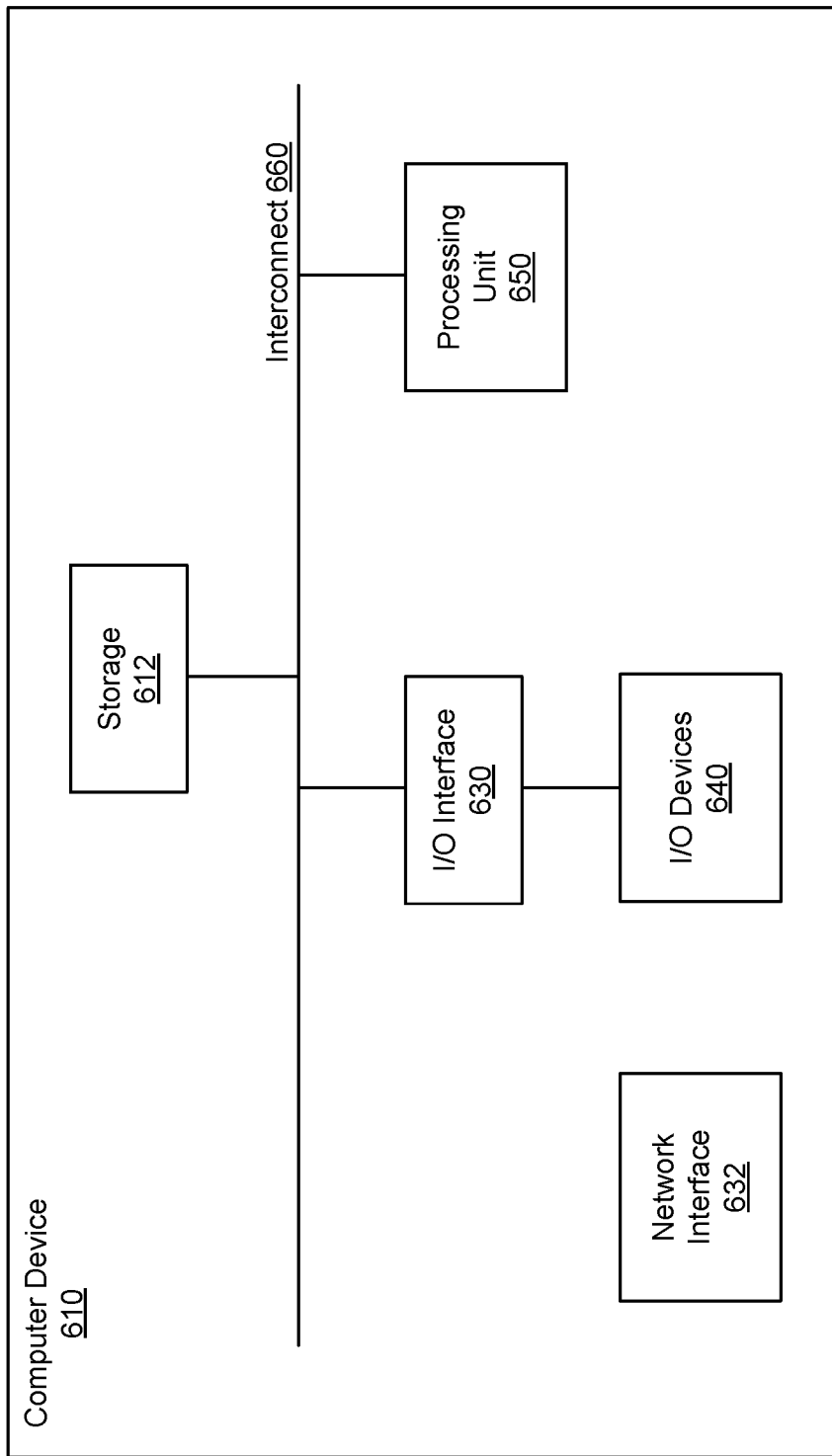
FIG. 5 is a block diagram illustrating an exemplary computing device, according to some embodiments.

Turning now to FIG. 5, a block diagram of one embodiment of computing device (which may also be referred to as a computing system) 510 is depicted. Computing device 510 may be used to implement various portions of this disclosure including any of the components illustrated in FIG. 1 and FIG. 2A-C. Computing device 510 may be any suitable type of device, including, but not limited to, a personal computer system, desktop computer, laptop or notebook computer, mainframe computer system, web server, workstation, or network computer. As shown, computing device 510 includes processing unit 550, storage 512, and input/output (I/O) interface 530 coupled via an interconnect 560 (e.g., a system bus). I/O interface 530 may be coupled to one or more I/O devices 540. Computing device 510 further includes network interface 532, which may be coupled to network 520 for communications with, for example, other computing devices.

In various embodiments, processing unit 550 includes one or more processors. In some embodiments, processing unit 550 includes one or more coprocessor units. In some embodiments, multiple instances of processing unit 550 may be coupled to interconnect 560. Processing unit 550 (or each processor within 550) may contain a cache or other form of on-board memory. In some embodiments, processing unit 550 may be implemented as a general-purpose processing unit, and in other embodiments it may be implemented as a special purpose processing unit (e.g., an ASIC). In general, computing device 510 is not limited to any particular type of processing unit or processor subsystem.

Storage subsystem 512 is usable by processing unit 550 (e.g., to store instructions executable by and data used by processing unit 550). Storage subsystem 512 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 512 may consist solely of volatile memory, in one embodiment. Storage subsystem 512 may store program instructions executable by computing device 510 using processing unit 550, including program instructions executable to cause computing device 510 to implement the various techniques disclosed herein.

I/O interface 530 may represent one or more interfaces and may be any of various types of interfaces configured to couple to and communicate with other devices, according to various embodiments. In one embodiment, I/O interface 530 is a bridge chip from a front-side to one or more back-side buses. I/O interface 530 may be coupled to one or more I/O devices 540 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method, comprising:
    receiving, by a service provider system comprising one or more hardware processors, transaction information associated with a first digital transaction;
    updating, by the service provider system, a first aggregated hash value corresponding to a first set of digital transactions that were previously processed by a first transaction module included in the service provider system, the updating comprising executing a hashing function that hashes a combination of the transaction information and the first aggregated hash value, the hashing function having a commutative property and an associative property;
    comparing, by the service provider system, the updated first aggregated hash value to a second aggregated hash value generated via execution of the hashing function with respect to a second set of digital transactions processed by a second transaction module included in the service provider system; and
    based on the comparing, determining, by the service provider system, whether the second transaction module has processed the same transactions as the first transaction module.

2. The method of claim 1, wherein the transaction information associated with the first digital transaction-was previously transmitted asynchronously by the first transaction module to the second transaction module.

3. The method of claim 1, further comprising:
   determining, based on the comparing, that the updated first aggregated hash value is different from the second aggregated hash value; and
   responsive to the determining that the updated first aggregated hash value is different from the second aggregated hash value, performing one or more reconciliation actions.

4. The method of claim 3, wherein the performing the one or more reconciliation actions comprises:
   identifying a missing transaction that was transmitted to the second transaction module by the first transaction module but that was not processed by the second transaction module;
   causing the second transaction module to process the missing transaction; and
   updating the second aggregate hash value using the hashing function to indicate the processing of the missing transaction by the second transaction module.

5. The method of claim 1, further comprising:
   determining that the updated first aggregated hash value is equal to the second aggregated hash value, the first set of digital transactions and the first digital transaction being processed by the first transaction module in a different order than the second set of digital transactions processed by the second transaction module.

6. The method of claim 1, wherein the hashing function does not have an identity property.

7. The method of claim 1, wherein the first transaction module transmits the first digital transaction to the second transaction module prior to the updating the first aggregate hash value.

8. A non-transitory machine-readable medium having stored thereon machine-readable instructions executable to cause a machine to perform operations comprising:
   receiving transaction information associated with a first digital transaction;
   updating a first aggregated hash value corresponding to a first set of digital transactions that were previously processed by a first transaction module included in a service provider system, the updating comprising executing a hashing function that hashes a combination of the transaction information and the first aggregated hash value, the hashing function having a commutative property and an associative property;
   comparing the updated first aggregated hash value to a second aggregated hash value generated via execution of the hashing function with respect to a second set of digital transactions processed by a second transaction module included in the service provider system; and
   based on the comparing, determining whether the second transaction module has processed the same transactions as the first transaction module.

9. The non-transitory machine-readable medium of claim 8, wherein the transaction information associated with the first digital transaction was previously transmitted asynchronously by the first transaction module to the second transaction module.

10. The non-transitory machine-readable medium of claim 8, wherein the operations further comprise:
    determining, based on the comparing, that the updated first aggregated hash value is different from the second aggregated hash value; and
    responsive to the determining that the updated first aggregated hash value is different from the second aggregated hash value, performing one or more reconciliation actions.

11. The non-transitory machine-readable medium of claim 10, wherein the performing the one or more reconciliation actions comprises:
    identifying a missing transaction that was transmitted to the second transaction module by the first transaction module but that was not processed by the second transaction module;
    causing the second transaction module to process the missing transaction; and
    updating the second aggregate hash value using the hashing function to indicate the processing of the missing transaction by the second transaction module.

12. The non-transitory machine-readable medium of claim 8, wherein the operations further comprise:
    determining that the updated first aggregated hash value is equal to the second aggregated hash value, the first set of digital transactions and the first digital transaction being processed by the first transaction module in a different order than the second set of digital transactions processed by the second transaction module.

13. The non-transitory machine-readable medium of claim 8, wherein the hashing function does not have an identity property.

14. A service provider system, comprising:
    a non-transitory memory; and
    one or more hardware processors coupled to the non-transitory memory and configured to read instructions from the non-transitory memory to cause the service provider system to perform operations comprising:
      receiving transaction information associated with a first digital transaction;
      updating a first aggregated hash value corresponding to a first set of digital transactions that were previously processed by a first transaction module included in the service provider system, the updating comprising executing a hashing function that hashes a combination of the transaction information and the first aggregated hash value, the hashing function having a commutative property and an associative property;
      comparing, by the service provider system, the updated first aggregated hash value to a second aggregated hash value generated via execution of the hashing function with respect to a second set of digital transactions processed by a second transaction module included in the service provider system; and
      based on the comparing, determining, by the service provider system, whether the second transaction module has processed the same transactions as the first transaction module.

15. The system of claim 14, wherein the transaction information associated with the first digital transaction was previously transmitted asynchronously by the first transaction module to the second transaction module.

16. The system of claim 14, wherein the operations further comprise:
    determining, based on the comparing, that the updated first aggregated hash value is different from the second aggregated hash value; and
    in response to the determining that the updated first aggregated hash value is different from the second aggregated hash value, performing one or more reconciliation actions.

17. The system of claim 15, wherein the performing the one or more reconciliation actions comprises:

identifying a missing transaction that was transmitted to the second transaction module by the first transaction module but that was not processed by the second transaction module;

causing the second transaction module to process the missing transaction; and updating the second aggregate hash value using the hashing function to indicate the processing of the missing transaction by the second transaction module.

18. The system of claim 14, wherein the operations further comprise:

determining that the updated first aggregated hash value is equal to the second aggregated hash value, the first set of digital transactions and the first digital transaction being processed by the first transaction module in a different order than the second set of digital transactions processed by the second transaction module.

19. The system of claim 14, wherein the hashing function does not have an identity property.

20. The system of claim 14, wherein the first transaction module transmits the first digital transaction to the second transaction module prior to the updating the first aggregate hash value.

\* \* \* \* \*